(No Model.)
J. C. DUNFEE.
DINNER BUCKET.
No. 480,184. Patented Aug. 2, 1892.
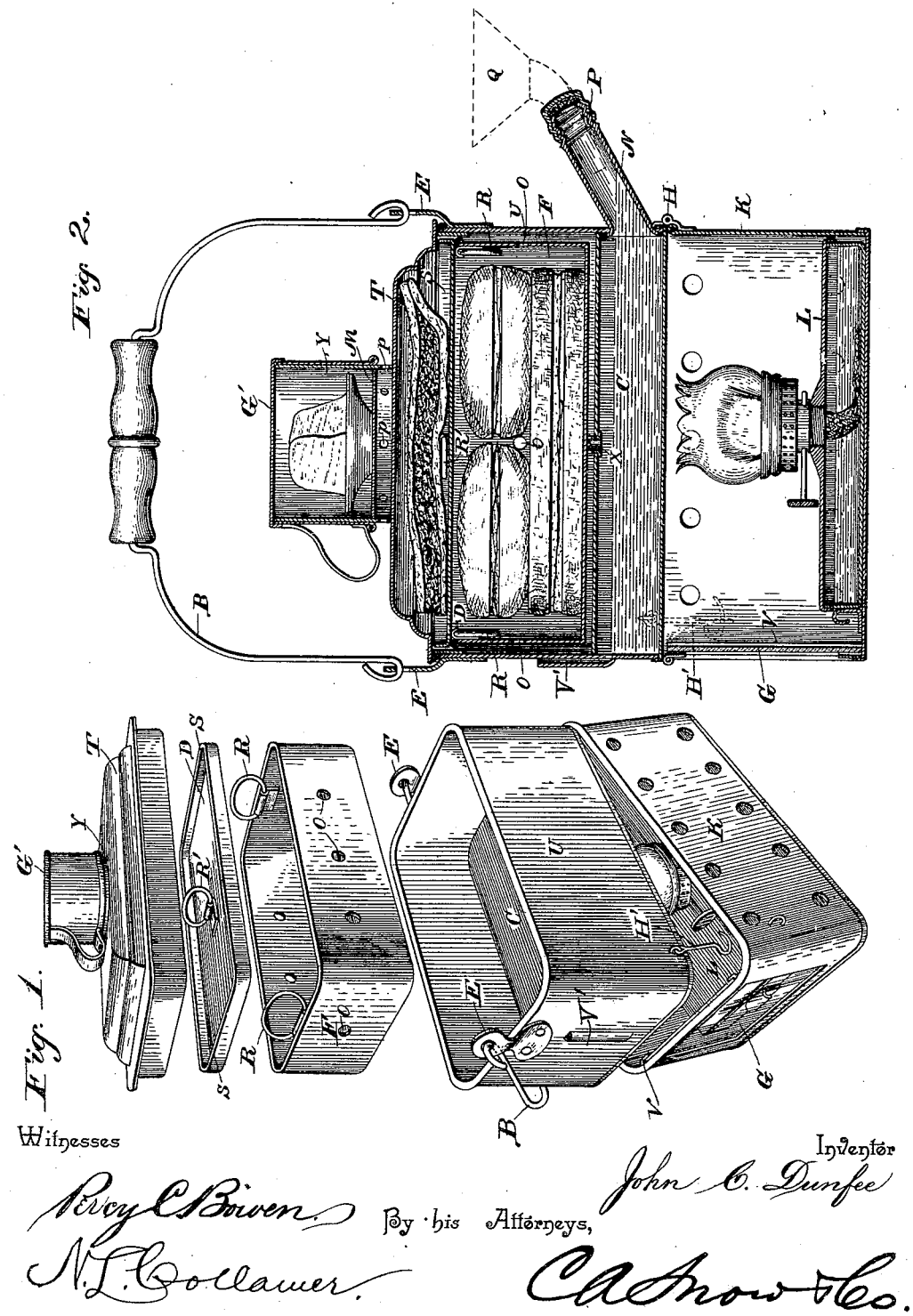

UNITED STATES PATENT OFFICE.

JOHN C. DUNFEE, OF UNIONVILLE CENTRE, ASSIGNOR TO ROBERT E. ROBINSON, OF PLAIN CITY, OHIO.

DINNER-BUCKET.

SPECIFICATION forming part of Letters Patent No. 480,184, dated August 2, 1892.

Application filed June 17, 1891. Serial No. 396,583. (No model.)

*To all whom it may concern:*

Be it known that I, JOHN C. DUNFEE, a citizen of the United States, residing at Unionville Centre, in the county of Union and State of Ohio, have invented a new and useful Dinner-Bucket, of which the following is a specification.

This invention relates to lunch-heaters, whereby the midday meal may be kept warm even in cold weather; and the object of the invention is to effect certain improvements in devices of this character.

To this end the invention consists in the specific details of construction hereinafter more fully described and claimed, and as illustrated on the accompanying sheet of drawings, wherein—

Figure 1 is a perspective view of this device with its parts slightly separated. Fig. 2 is a central longitudinal vertical section of the parts assembled.

Referring to the said drawings, the letter L designates a flat lamp-body, which rests within the bottom of this device and is surrounded by a casing K, having perforations for the admission and exit of air and having a piece of glass G in one end, as shown, so that when this casing is carried by the operator after dark the light from the lamp will shine through the glass upon the path being trodden and will be serviceable as a lantern. This glass G is mounted in vertical guides V, so that it may be removed and replaced by a red or green glass, as when the operator is a railroad man. The letter U designates the upper part of this device, which is connected at one end by hinges H to the casing K and at the other end by hooks H', so that it may be turned up to gain access to the lamp when desired, and this upper part has ears E at its ends from which rises the usual bail B, having a handle by which the device is carried. This upper portion has a false bottom forming a chamber C for coffee or other liquids, and from one end of this chamber projects a slightly upwardly-extending nozzle N, closed by a suitable cap or plug P, while at its other end is a steam-exit vent V', rising to some height, so that the coffee will not be spilled out even if the device is considerably tipped. Within the body of the upper portion U is a removable receptacle F for food, and this receptacle has at its ends ring-shaped handles R, adapted to be turned down, as shown in Fig. 2, when the receptacle is in place. The said receptacle is preferably provided in its sides and ends with openings O, and the top of the chamber C has an exit-opening in which is fitted a tube X, rising from the hot liquid therein and extending above the false bottom and serrated at its upper end, as shown, to form steam-ports for steam rising from the hot liquid therein, so that a certain amount of steam is at all times passing upwardly around the receptacle F to keep it and its contents warm, the receptacle F resting upon the upper end of the tube X, whereby the bottom of the receptacle is supported above the false bottom of the boiler, and hence the steam-space is formed between the bottom of the receptacle and the false bottom, which space communicates with the steam-space surrounding the receptacle.

The letter D designates a disk having slightly-upturned edges S, and preferably having a ring-handle R' at its center. The receptacle F does not come flush with the upper edge of the upper portion U of the body, and the disk D with its up-turned sides or edges rests on the upper edge of the receptacle, thus serving as a pan and also as a removable cover for the receptacle. This disk is for pie, cake, and other food that it is not desired to keep so very warm, and it will be obvious that its remoteness from the source of heat will serve this end.

The letter T designates the top or cover of this device, from whose center rises a cylindrical tube Y, having perforations p in its sides and above them a false bottom M, and G' is a mug or cup fitting over this cylinder and closing the open upper end thereof; but the cup is not as deep as the length of the tube Y, whereby the perforations p are exposed. The space thus formed between the bottom M and the bottom of the cup is for butter and is most remote from the source of heat, the perforations p permitting a free circulation of air through the cylinder beneath the butter-receptacle. The cup can of course be withdrawn, and by removing the cap P from the nozzle N the user can have hot-liquid refreshment whenever desired. The lamp keeps the food and drink warm at all times, and by the addition of the glass the device becomes a lantern as well. The upturned edges of the disk D are useful for keeping the juices of pies or preserves from running off the disk into the receptacle F below and soaking the solid food therein. The entire device is preferably of block-tin and may be painted or japanned, as desired, and the relative sizes, shapes, and proportions of parts do not affect the merits of the invention. A cover or top F is provided with a depending annular flange, which takes into the space formed by the outer wall of the boiler and the wall of the pan or disk D.

The funnel Q (shown in Fig. 2) is useful though not absolutely necessary in connection with the above-described device. It is to be used in filling the coffee-chamber C after the plug P has been removed from the nozzle N, and it may or may not be stored during the day in the receptacle F, though it preferably remains with the housewife for use the next morning.

What I claim as new is—

1. In a lunch-heater, the combination, with a lamp-heater within a lower portion or casing, a solid upper portion connected thereto and having a false bottom forming a liquid-chamber, and a nozzle for said chamber, of a removable food-receptacle fitting loosely within said upper portion and rising nearly to the upper edge thereof, a steam-tube extending through and above the false bottom, provided with steam-ports and supporting the receptacle, a disk fitting in the upper portion above said receptacle, upon whose edges it rests, the edges of said disk being turned upwardly, and a top or cover closing said upper portion above the disk and provided with an annular flange depending into the space between the wall of the boiler and that of the pan or disk, as and for the purpose set forth.

2. In a lunch-heater, the combination, with a lamp-heater within a lower portion or casing, of an upper portion connected thereto and having a false bottom forming a liquid-chamber above the heater, an upwardly-inclined nozzle at one end of said chamber, a removable plug on said nozzle, a steam-exit vent at the other end rising for some distance along the outer face of the upper portion, said false bottom having a steam-exit opening, and a food-receptacle fitting loosely within said upper portion above the false bottom, as and for the purpose hereinbefore set forth.

In testimony that I claim the foregoing as my own I have hereto affixed my signature in presence of two witnesses.

JOHN C. DUNFEE.

Witnesses:
ALBERT HANES,
ANDREW JACKSON MARTIN.